United States Patent
Covington, Jr. et al.

[11] Patent Number: 5,863,589
[45] Date of Patent: Jan. 26, 1999

[54] POURABLE CANOLA OIL FOR FOOD APPLICATIONS

[75] Inventors: Robert M. Covington, Jr., Rossville, Tenn.; Ernie H. Unger, Idaho Falls, Id.

[73] Assignee: Cargill, Incorporated, Wayzata, Minn.

[21] Appl. No.: 928,783

[22] Filed: Sep. 12, 1997

Related U.S. Application Data

[63] Continuation of Ser. No. 553,704, filed as PCT/US94/06352 Jun. 10, 1994, abandoned, which is a continuation of Ser. No. 78,384, Jun. 17, 1993, abandoned.

[51] Int. Cl.$^6$ ....................................................... A23D 9/00
[52] U.S. Cl. ................................................ 426/601; 554/1
[58] Field of Search ................................. 426/601; 554/1

[56] References Cited

FOREIGN PATENT DOCUMENTS

| | | |
|---|---|---|
| 835 334 | 2/1970 | Canada . |
| 0 323 753 | 7/1989 | European Pat. Off. . |
| WO 91/15578 | 4/1990 | WIPO . |
| WO 92/03919 | 3/1992 | WIPO . |
| WO 93/06714 | 4/1993 | WIPO . |
| WO 93/17566 | 9/1993 | WIPO . |
| WO94/15478 | 7/1994 | WIPO . |

OTHER PUBLICATIONS

Pricat Catalysts, Versatile Catalysts for Hydrogenation of Triglycerides and Fatty Acids, Hydrogenation of Canola Oil, Tech Info Bulletin Mar. 1992.

NTIS Tech Notes, p. 618, Sep. 1992.
Warner et al., American Oil Chemists' Society, 70:983–988, 1993.
Stevenson et al., Canadian Institute of Food Science and Technology Journal, 17:187–194, 1984.
Database WPI, Week 9249, Derwent Publications Ltd., London, GB; AN 92–399446 & CS, D, 748 889 (Palma SP) 17 Jun. 1992.
Database WPI, Week 7735, Derwent Publications Ltd., London, GB; AN 77–6187Y & JP,A,52 085 206 (Asahi Electrochem Inid KK) 15 Jul. 1977.
Food Marketing & Technology, 6:20–24, 1992.
Z. Hawrysh, Inform, 3:543, 1992, Abstract No. BBB5.
R. Carr, Food Technology, 45:95–96, 1991.
Bansal et al., J. of Food Science, 47:1338–1344, 1982.
Koseoglu et al., Canola and Rapeseed, Shahidi (Ed.), Chap. 8, pp. 123–148, 1990.
Hydrogenation of Canola Oil, Tech Info Bulletin, Mar. 1992.
Erickson et al., Evaluation of Finished Oil Quality, Chap. 15, 1990.
Mounts et al., JAOCS, 65 No. 4, pp. 624–628, Apr. 1988.
Warner et al., JAOCS, No. 4, pp. 558–564, Apr. 1989.
Eskin et al., JAOCS, 66 No. 8, pp. 1081–1084, Aug. 1989.

*Primary Examiner*—Carolyn Paden
*Attorney, Agent, or Firm*—Fish & Richardson, P.C., P.A.

[57] ABSTRACT

A pourable partially hydrogenated canola oil having a maximum saturated fatty acid content of about 9.6% and a maximum trans fatty acid content of about 22.1% especially suitable for food applications is disclosed.

17 Claims, No Drawings

POURABLE CANOLA OIL FOR FOOD APPLICATIONS

This application is a continuation of U.S. Ser. No. 08/553704 filed Apr. 18 1996 now abandoned which is a National Stage of International Application No. PCT/US94/06352 filed Jun. 10, 1994 which is a continuation of U.S. Ser. No. 08/078384 filed Jun. 17 1993 now abandoned.

The present application relates to a pourable partially hydrogenated canola oil low in saturated fatty acids and low in trans fatty acids having improved flavor and performance attributes especially suitable for food applications.

BACKGROUND

Canola oil has the lowest level of saturated fatty acids of all vegetable oils. As consumers become more aware of the health impact of lipid nutrition, consumption of canola oil in the U.S. has increased. However generic canola oil has limited use in deep frying operations, an important segment of the food processing industry, due to its instability. Oil extracted from the seed of commercial canola (rapeseed) varieties contains a relatively high (8%–13%) linolenic acid content ($C_{18:3}$) (ALA). Linolenic acid has been reported to oxidize faster than other fatty acids. Linoleic and linolenic acids have been suggested as precursors to undesirable odor and flavor development in foods. Generic canola oil is unstable and easily oxidized during cooking, which in turn compromises the sensory characteristics of foods cooked in such oils. It also develops unacceptable off odors and rancid flavors during storage.

Hydrogenation can be used to improve performance attributes by lowering the amount of linoleic and linolenic acids in the oil. In this process the oil increases in saturated and trans fatty acids, both undesirable when considering health implications. Bansal et al. Journal of Food Science Vol. 47 p. 1338 (1982) describe the effect of hydrogenation under selective and nonselective conditions using commercial nickel catalysts on the chemical composition of canola oil. Generally selective hydrogenation conditions resulted in a higher level of trans isomers. Research has shown that diets high in saturated fats increase low density lipoproteins, which promote the deposition of cholesterol on blood vessels. More recently, dietary consumption of foods high in trans fatty acids have also been linked to increased serum cholesterol content.

A canola oil having improved stability in its flavor and performance attributes for use in food operations is needed. In particular, a partially hydrogenated canola oil having improved frying performance but with low saturated fatty acid content and low trans fatty acid content is desired. The present invention provides such an oil.

SUMMARY OF THE INVENTION

The present invention provides an oil comprising a partially hydrogenated canola having a maximum saturated fatty acid content of about 9.6% and a maximum trans fatty acid content of about 22.1%. The oil of the present invention also has fry stability as demonstrated by lower off-flavor development compared to the industry standard frying shortening. The present invention further comprises a method of improving the flavor of fried foods comprising frying the foods in the oil of the present invention.

DETAILED DESCRIPTION OF THE INVENTION

The present invention provides a hydrogenated canola oil low in saturated fatty acids and in trans fatty acids having superior stable flavor and frying attributes when compared to known canbla frying oils.

In the context of this disclosure, a number of terms are used. Saturated fatty acids include myristic ($C_{14:0}$), palmitic ($C_{16:0}$), stearic ($C_{10:0}$), arachidic ($C_{20:0}$), behenic ($C_{22:0}$), and lignoceric ($C_{24:0}$) acids. Trans fatty acids include any trans isomer of a $C_{14}$ through $C_{24}$ fatty acid.

As used herein "functionality" or "performance attributes" means properties or characteristics of the canola oil and includes flavor stability, fry stability, and oxidative stability.

Oxidative stability relates to how easily components of an oil oxidize which creates off-flavors in the oil, and is measured by instrumental analysis such as Accelerated Oxygen Method (AOM) American Oil Chemists' Society Official Method Cd 12–57 for Fat Stability:Active Oxygen Method (re'vd 1989), and Rancimat (Laubli M. W. and Bruttel P. A., JOACS 63:792–795 (1986)). The degree of oxidative stability is rated as the number of hours to reach a peroxide value of 100.

Fry stability relates to the resistance to degeneration of the oil during frying. "Fry life" is the time it takes for the flavor of a product fried in an oil to degrade to give a set score using sensory analysis. Improved stability characteristics of the oil are reflected in improved flavors of the foods prepared in the oil. Flavor stability is determined by periodic sensory analysis of foods fried in the oil by a trained sensory panel. Oils for restaurants, hospitals, and large institutions primarily are used for frying foods and require fry stability.

A sensory panel refers to those individuals involved in the sensory evaluation of the edible food product. The panelists are prescreened to detect the flavor differences in the particular product tested. The panel is trained in sensory descriptions. The panel provides qualitative and quantitative scores for the sensory evaluation which are referenced against calibrated standards. The results of the panel are reproducible.

"Canola" refers to rapeseed (Brassica) which has an erucic acid ($C_{22:1}$) content of at most 2 percent by weight based on the total fatty acid content of a seed, preferably at most 0.5 percent by weight and most preferably essentially 0 percent by weight and which produces, after crushing an air-dried meal containing less than 30 micromoles ($\mu$mol) of glucosinolates per gram of defatted (oil-free) meal.

The oil of the present invention is designated IMC 983. IMC 983 is a refined, bleached, partially hydrogenated and deodorized pourable canola oil. This oil is liquid and has no solid fats at 10° C. or above. IMC 983 is made by partially hydrogenating a starting oil designated as IMC 129. IMC 129 oil is produced from *Brassica napus* plant line, a Spring canola variety, designated IMC 129. It is described in detail in U.S. PVP Certificate No. 9100151. The IMC 129 variety possesses high oleic acid in the seed oil. This oil has an oleic acid content of about 75 to 80% by weight, a linoleic acid content of about 5 to 10% by weight, a linolenic acid content of less than 7% by weight, and an erucic acid content of less than 2% by weight. The oil has an iodine value of about 90 to 110.

Hydrogenation is done at a temperature of from about 120° C. to about 170° C. Standard batch hydrogenation equipment featuring internal steam heating and water cooling is used. A selective nickel supported catalyst such as Nysel 325 (Engelhard Cleveland Ohio) G-95 (United Catalyst Louisville Ky.) Calcicat 472 (Mallinkrodt Erie Pa.), or Pricat 9920 (Unichem, Emmerich, Germany) may be used. The IMC 129 starting oil is hydrogenated to a refractive index of approximately 1.4593 at 48° C. and an iodine value of between about 77 and 87.

The resulting canola oil of the present invention (IMC 983) has a maximum saturated fatty acid content of about 9.6% and a maximum trans fatty acid content of about 22.1%. It also has a minimum oxidative stability of about 176 AOM hours in the absence of antioxidants. It has an oleic acid content of about 83.6% and an iodine value of about 82 to about 84.

Under extended frying conditions, the IMC 983 oil is significantly lower than commercial frying oils in the development of off-flavors. Trained sensory panelists found food fried in IMC 983 significantly better than that cooked in commercial frying oil in 6 of 12 categories of sensory characteristics for rating off-flavor development.

The oil of the present invention is especially suitable for use in food applications, in particular for frying foods, due to its superior oxidative stability and fry stability. Due to its low levels of saturated fatty acids and trans fatty acids, it is especially desirable for human consumption over heavily hydrogenated frying oils. Common additives can be added to the oil of the present invention such as a stabilizer, flavoring, emulsifier, anti-spattering agent, colorant or anti-oxidant.

The present invention is further defined in the following Examples, in which all parts and percentages are by weight and degrees are Celsius, unless otherwise stated. It should be understood that these Examples, while indicating preferred embodiments of the invention, are given by way of illustration only.

EXAMPLE 1

The fatty acid composition of the IMC 129 starting oil which was hydrogenated is provided in Table 1. The iodine value of the starting oil was 98.6. The refractive index of the starting oil was 1.4608 at 48° C.

TABLE 1

Fatty Acid Composition of the Starting Oil

| Starting Oil | Fatty Acid Composition (%) | | | | | | | | | |
|---|---|---|---|---|---|---|---|---|---|---|
| | $C_{14:0}$ | $C_{16:0}$ | $C_{18:0}$ | $C_{18:1}$ | $C_{18:2}$ | $C_{18:3}$ | $C_{22:0}$ | $C_{22:1}$ | $C_{24:0}$ | Sats[1] |
| IMC 129 | 0 | 3.6 | 2.2 | 75.9 | 9.1 | 5.4 | 0.4 | 0.2 | 0.2 | 7.1 |

[1]Total content of saturated fatty acids

The hydrogenation was conducted in a standard batch hydrogenation reactor at a pressure varying between 200 and 220 kPa. The oil was heated to an initial gassing temperature of 145° C. and the hydrogenation was conducted over a period of approximately 24 min. The nickel catalyst used was Nysel 325. The oil was hydrogenated to a refractive index of 1.4593 at 48° C.

After the hydrogenation 80 to 100 ppm citric acid dissolved in propylene glycol was added to the oil prior to filtration to help in the removal of nickel and iron from the oil. The hydrogenated oil was deodorized under standard deodorization conditions for canola. Fatty acid composition of the hydrogenated and deodorized IMC 983 oil is in Table 2. The IMC 983 oil was clear and brilliant at 40° C. Other physical properties of the IMC 983 oil are described in Table 3.

TABLE 2

Fatty Acid Composition (%) of IMC 983 Oil

| Fatty Acid | % |
|---|---|
| $C_{14:0}$ | 0 |
| $C_{16:0}$ | 3.8 |
| $C_{18:0}$ | 4.5 |
| $C_{18:1}$ | 83.6 |
| $C_{18:2}$ | 4.1 |
| $C_{18:3}$ | 0.2 |
| $C_{20:0}$ | 0.7 |
| $C_{22:0}$ | 0.4 |
| $C_{24:0}$ | 0.2 |
| Sats[1] | 9.6 |
| Trans[2] | 22.1 |

[1]Total content of saturated fatty acids
[2]Total content of trans fatty acids

TABLE 3

Physical Measurements of IMC 983

| Parameter | |
|---|---|
| Refractive Index at 48° C. | 1.4593 |
| Free Fatty Acids (%) | 0.01 |
| Lovibond Color, 5 ¼" | 0.3 Red |
| Iodine Value | 82.0 |
| Trans Isomers (%) | 22.1 |
| AOM hours | 176 |

EXAMPLE 2

The oil of Example 1 was subjected to further testing to determine frying stability as measured by off-flavor development.

French fry preparation in restaurants occurs in two steps. Potatoes are cut and partially cooked, a process called par frying, and frozen by a food processor for delivery to individual restaurants. The frozen par fried french fries are then recooked, a process called finish frying, at the restaurant immediately prior to service. IMC 983 oil of Example 1 was tested against 189LC, an leading industry standard frying oil, a partially hydrogenated soybean oil available from Interstate Foods Corp., 3800 S. Morgan Street, Chicago, Ill. 60609 for finish frying of french fries. The quality of the french fries finish fried in each oil were then evaluated to determine the fry stability of each oil for restaurant frying.

The IMC 983 and 189LC oils were tested in a 21-day fry test which simulated commercial food service conditions. Twenty-three (23) kg of each oil was placed into each fryer (FryMaster MACH352SD, Frymaster Corp., Welbilt Co., Shreveport La.) and fried according to a schedule which simulates frying in fast food restaurants (Table 4). The par fry french fries used for finish frying with 189LC were produced in partially hydrogenated soybean oil. The par fry french fries used for finish frying with IMC 983 were produced in partially hydrogenated canola oil. Tallow flavoring was added to both par fry oils to standardize test conditions.

TABLE 4

Frying Schedule for Oil Testing

| Time | Activity | Baskets |
|---|---|---|
| 6:00 a.m. | Turn on fryers | 0 |
| 6:00 a.m.–8:00 a.m. | Idle fryers at set point | 0 |
| 8:00 a.m.–9:00 a.m. | Fry baskets every 5 min. Fry 2 baskets twice and then 1 basket the rest of the hour | 14 |
| 9:00 a.m.–10:00 a.m. | Fry baskets every 5 min. Fry 2 baskets twice and then 1 basket the rest of the hour | 14 |
| 10:00 a.m.–10:30 a.m. | Fry 2 baskets every 5 min. | 12 |
| 10:30 a.m.–11:00 a.m. | Idle fryers | 0 |
| 11:00 a.m.–1:00 p.m. | Fry 1 basket every 5 min. | 24 |
| 1:00 p.m.–1:30 p.m. | Idle fryers | 0 |
| 1:30 p.m.–6:00 p.m. | Fry 1 basket every 7 ½ min. | 36 |
| 6:00 p.m.–6:30 p.m. | idle fryers | 0 |
| 6:30 p.m.–8:00 p.m. | Fry 1 basket every 4 ½ min. | 20 |

The par fried french fries were finish fried in the IMC 983 and 189LC oils using a fry time of 3 minutes. The oil temperature was maintained at 171° C. Fresh oil was added at 10:30 a.m. (after high volume frying), 6:00 p.m. (after high volume frying) and 8:00 p.m. (after filtration) to make up for oil absorption into the french fries. Each frying oil was filtered nightly with 0.23 kg of fresh Magnesol XL filter media available from Dallas Group Jeffersonville Ind., utilizing the Prince Castle filter available from Prince Castle, Carole Stream Ill. A total of 116 baskets (85.7 kg) of french fries were finish fried daily. A total of 1800 kg of french fries were cooked in each oil over the entire test.

The french fries were checked daily for color, internal texture, external texture, and flavor. Color measurements were made by an Agtron instrument. Internal texture, external texture, aroma, and flavor of the french fries were determined by a trained sensory panel. Over the entire duration of the fry test, the panel failed to detect any significant differences in the internal or external texture of the french fries. However, the french fries which had been finish fried in IMC 983 were significantly better than those cooked in 189LC in 6 of the 12 categories where off-flavor development was lower (Table 5). IMC 983 was not significantly different from 189LC in the other categories. The sensory panel concluded that the french fries cooked in the 189LC oil would be judged unacceptable by the average food service manager starting on day 16, while the french fries cooked in IMC 983 were acceptable through the entire 21-day test.

TABLE 5

Characteristics of French Fries Cooked in IMC 983 Oil

| Sensory Characteristic | Performance of IMC 983* |
|---|---|
| Overall Intensity - Aroma | Not significantly different |
| Fried Aroma | Not significantly different |
| Tallow Aroma | Lower than 189LC |
| Burnt Aroma | Not significantly different |
| Atypical Aroma | Not significantly different |
| Overall Intensity - Flavor | Not significantly different |

TABLE 5-continued

Characteristics of French Fries Cooked in IMC 983 Oil

| Sensory Characteristic | Performance of IMC 983* |
|---|---|
| Vegetable Oil Flavor | Lower than 189LC |
| Burnt Flavor | Lower than 189LC |
| Painty Flavor | Not significantly different |
| Atypical Flavor | Lower than 189LC |
| Overall Intensity - Aftertaste | Lower than 189LC |
| Atypical Aftertaste | Lower than 189LC |

*Significant at 95% Confidence Interval

Measurement of french fry color and free fatty acid show that both oils were comparable (Table 6). No significant differences exist between the french fries for either of these characteristics.

TABLE 6

French Fry Color and Free Fatty Acid Content of Frying Oils

| Analysis | Fried Color | | Free Fatty Acid, % | |
|---|---|---|---|---|
| Days/Oil | 189LC | IMC 983 | 189LC | IMC 983 |
| 1 | 60.70 | 60.30 | 0.26 | 0.28 |
| 2 | 51.50 | 64.40 | 0.49 | 0.51 |
| 3 | 59.80 | 62.80 | 0.71 | 0.82 |
| 4 | 50.80 | 62.10 | 1.09 | 1.16 |
| 5 | 59.90 | 64.40 | 1.31 | 1.53 |
| 6 | 50.40 | 60.00 | 1.60 | 1.96 |
| 7 | 61.10 | 63.80 | 1.90 | 2.22 |
| 8 | 62.00 | 62.30 | 2.20 | 2.90 |
| 9 | 61.60 | 58.80 | 3.00 | 3.30 |
| 10 | 59.60 | 61.20 | 3.23 | 3.99 |
| 11 | 60.20 | 62.30 | 3.40 | 4.51 |
| 12 | 58.60 | 59.90 | 3.88 | 5.33 |
| 13 | 55.30 | 58.80 | 4.59 | 5.89 |
| 14 | 51.70 | 59.60 | 4.85 | 6.31 |
| 15 | 53.60 | 58.90 | 5.02 | 6.69 |
| 16 | 53.20 | 54.10 | 5.46 | 7.20 |
| 17 | 53.10 | 56.40 | 5.67 | 7.41 |
| 18 | 55.20 | 58.00 | 5.82 | 7.41 |
| 19 | 56.20 | 58.20 | 6.04 | 7.79 |
| 20 | 50.80 | 55.50 | 7.16 | 8.36 |
| 21 | 52.20 | 55.40 | 7.08 | 8.22 |

Analysis of the oil content (%) of the finish fry french fries and the amount of makeup oil (kg) required daily show that french fries cooked in IMC 983 absorbed 6% less oil (Table 7). Conversely, each pound of IMC 983 oil fried 1.87 more pounds of french fries than each pound of 189LC oil.

TABLE 7

Oil Absorption in Finish Fried French Fries

| Oil Absorption | Oil Content, % | | Makeup Oil, kg | |
|---|---|---|---|---|
| Days/Oils | 189LC | IMC 983 | 189LC | IMC 983 |
| 1 | 17.00 | 16.00 | 5.8 | 3.0 |
| 2 | 17.30 | 15.20 | 3.8 | 3.4 |
| 3 | 15.50 | 14.80 | 5.0 | 4.2 |
| 4 | 15.80 | 15.30 | 5.4 | 3.9 |
| 5 | 15.30 | 15.30 | 5.9 | 4.5 |
| 6 | 15.40 | 15.30 | 4.9 | 3.9 |
| 7 | 14.70 | 13.90 | 5.0 | 4.4 |
| 8 | 15.70 | 15.50 | 4.2 | 3.4 |
| 9 | 15.10 | 15.60 | 4.9 | 4.0 |
| 10 | 15.50 | 16.00 | 5.3 | 4.2 |

TABLE 7-continued

Oil Absorption in Finish Fried French Fries

| Oil Absorption | Oil Content, % | | Makeup Oil, kg | |
|---|---|---|---|---|
| Days/Oils | 189LC | IMC 983 | 189LC | IMC 983 |
| 11 | 15.10 | 15.30 | 4.2 | 3.9 |
| 12 | 15.60 | 14.60 | 4.5 | 4.5 |
| 13 | 16.20 | 16.10 | 4.2 | 3.8 |
| 14 | 16.80 | 14.90 | 4.1 | 3.8 |
| 15 | 16.30 | 14.70 | 4.2 | 4.2 |
| 16 | 19.50 | 15.30 | 4.0 | 3.6 |
| 17 | 16.00 | 14.70 | 3.7 | 3.9 |
| 18 | 14.90 | 15.00 | 3.6 | 3.9 |
| 19 | 18.00 | 16.10 | 3.9 | 3.6 |
| 20 | 16.20 | 13.90 | 4.2 | 4.2 |
| 21 | 15.70 | 15.20 | 3.0 | 2.8 |
| Average | 16.08 | 15.18 | N/A | N/A |
| Total | N/A | N/A | 93.8 | 81.1 |

In addition to the stability characteristics described above, IMC 983 also has lower levels of saturated fatty acids and trans fatty acids (Table 8).

TABLE 8

Fatty Acid Composition (%) of Frying Shortening

| Fatty Acid | IMC 983 | 189LC |
|---|---|---|
| $C_{14:0}$ | 0 | 0 |
| $C_{16:0}$ | 3.8 | 11.7 |
| $C_{18:0}$ | 4.5 | 10.1 |
| $C_{18:1}$ | 83.6 | 65.2 |
| $C_{18:2}$ | 4.1 | 9.5 |
| $C_{18:3}$ | 0.2 | 0.2 |
| $C_{20:0}$ | 0.7 | 0.3 |
| $C_{22:0}$ | 0.4 | 0.2 |
| $C_{24:0}$ | 0.2 | 0.1 |
| Sats[1] | 9.6 | 22.6 |
| Trans[2] | 22.1 | 43.4 |

[1]Total content of saturated fatty acids
[2]Total content of trans fatty acids

EXAMPLE 3

IMC 129 oil and a generic canola oil of the Alto variety, designated Oil A were hydrogenated to an iodine value of approximately 83. The fatty acid composition and iodine values of the IMC 129 and Oil A starting oils is provided in Table 9.

TABLE 9

Fatty Acid Composition of the Starting Oil

| Starting Oil | Fatty Acid Composition (%) | | | | | | |
|---|---|---|---|---|---|---|---|
| | $C_{14:0}$ | $C_{16:0}$ | $C_{18:0}$ | $C_{18:1}$ | $C_{18:2}$ | $C_{18:3}$ | I.V.[1] |
| IMC 129 | 0 | 3.6 | 2.0 | 75.7 | 9.5 | 6.2 | 94.2 |
| Oil A | 0 | 4.0 | 2.0 | 62.5 | 18.3 | 7.7 | 109.8 |

[1]I.V. = Iodine Value

The hydrogenation was conducted in a standard batch hydrogenation reactor at a pressure of about 210 kPa. The oil was heated to an initial gassing temperature of 150° C. and the hydrogenation was conducted using a nickel catalyst 0.2% Nysel 325. The oil was hydrogenated to an iodine value of about 83.

After the hydrogenation 80 to 100 ppm citric acid dissolved in propylene glycol was added to the oil prior to filtration to help in the removal of nickel and iron from the oil. The hydrogenated oil was deodorized under standard deodorization conditions for canola. Fatty acid composition of the hydrogenated and deodorized oils is in Table 10. The hydrogenated IMC 129 oil was designated IMC 983. Other physical properties of the hydrogenated oils are described in Table 11. Solid fat index profile was determined as in AOAC Official Method Cd 10–57 for solid fat index, revised 1989, American Oil Chemists Society.

TABLE 10

Fatty Acid Composition

| Fatty Acid | % | |
|---|---|---|
| Oil | IMC 983 | Oil A |
| $C_{14:0}$, % | 0 | 0 |
| $C_{16:0}$, % | 3.7 | 4.0 |
| $C_{18:0}$, % | 4.0 | 5.2 |
| $C_{18:1}$, % | 83.8 | 79.2 |
| $C_{18:2}$, % | 4.0 | 5.3 |
| $C_{18:3}$, % | 0.5 | 0.3 |
| $C_{20:0}$, % | 0.8 | 0.8 |
| $C_{22:0}$, % | 0.4 | 0.4 |
| $C_{24:0}$, % | 0.2 | 0.2 |
| Sats[1], % | 9.1 | 10.6 |

[1]Total content of saturated fatty acids

TABLE 11

Physical Measurements

| Parameter | IMC 983 | Oil A |
|---|---|---|
| Iodine Value | 83.6 | 83.1 |
| Trans Isomers, % | 16.5 | 23.2 |
| Hydrogenation Time, min. | 30 | 60 |
| Solid Fat Index, % | | |
| 10.0° C. | 0.0 | 4.4 |
| 21.1° C. | 0.0 | 0.7 |
| 26.7° C. | 0.0 | 0.0 |
| 33.3° C. | 0.0 | 0.0 |

The unique physical characteristic of IMC 983 (no solids at 10.0° C., low trans isomers and greater than 83% $C_{18:1}$) was only obtained by hydrogenating an oil with the fatty acid composition of IMC 129. As seen from Tables 10 and 11, the hydrogenation of a generic canola oil, such as Oil A, did not result in a product with these characteristics.

What is claimed is:

1. A pourable partially hydrogenated canola oil having a maximum trans fatty acid content of about 22.1% and a minimum oxidative stability of about 176 AOM hours in the absence of added antioxidants.

2. The oil of claim 1, wherein said oil is suitable for frying foods for at least 21 continuous days for at least 14 hours per day.

3. The oil of claim 1 to which has been added at least one additive selected from the group consisting of a stabilizer, flavoring, emulsifier, anti-spattering agent, colorant, or antioxidant.

4. The oil of claim 1, said oil having a $C_{18:1}$ content of about 83.6% to about 83.8%.

5. The oil of claim 1, said oil having an iodine value of about 82 to 84.

6. The oil of claim 1, said oil having 0% solid fat at 10° C.

7. A method of improving the flavor of fried foods comprising frying the foods in a partially hydrogenated canola oil having a maximum trans fatty acid content of about 22.1% and a minimum oxidative stability of about 176 AOM hours in the absence of added antioxidants.

8. The oil of claim 1, said oil having a saturated fatty acid content of less than about 9.6%.

9. The oil of claim 1, wherein said trans fatty acid content is from about 16.5% to about 22.1%.

10. A canola oil that has been partially hydrogenated to achieve an iodine value that is about 11 to about 17 units less than the iodine value of the starting oil, said hydrogenated oil having a maximum trans fatty acid content of about 22.1% and a minimum oxidative stability of about 176 AOM hours in the absence of added antioxidants.

11. The oil of claim 10, wherein said oil is suitable for frying foods for at least 21 continuous days for at least 14 hours per day.

12. The oil of claim 10, to which has been added at least one additive selected from the group consisting of a stabilizer, flavoring, emulsifier, anti-spattering agent, colorant, or antioxidant.

13. The oil of claim 10, said oil having a $C_{18:1}$ content of about 83.6% to about 83.8%.

14. The oil of claim 10, said oil having an iodine value of about 82 to about 84.

15. The oil of claim 10, said oil having 0% solid fat at 10° C.

16. The oil of claim 10, said oil having a saturated fatty acid content of less than about 9.6%.

17. The oil of claim 10, wherein said trans fatty acid content is from about 16.5% to about 22.1%.

* * * * *